United States Patent [19]
Jefferson

[11] Patent Number: 5,682,250
[45] Date of Patent: Oct. 28, 1997

[54] METHOD AND APPARATUS FOR REPRODUCING AN IMAGE WITHOUT SALT AND PEPPER SPECKS

[75] Inventor: Darrell E. Jefferson, San Jose, Calif.

[73] Assignee: Xerox Corporation, Stamford, Conn.

[21] Appl. No.: 359,788

[22] Filed: Dec. 20, 1994

[51] Int. Cl.$^6$ .................................................. H04N 7/12
[52] U.S. Cl. ............................. 358/448; 358/261.3
[58] Field of Search .......................... 358/261.1–261.3, 358/429–433, 405; 371/22.3; 395/183.01, 183.06, 184.01, 185.01, 185.09

[56] References Cited

U.S. PATENT DOCUMENTS

| | | | |
|---|---|---|---|
| 4,124,870 | 11/1978 | Schatz et al. | 358/429 |
| 4,150,400 | 4/1979 | Wong | 358/261.3 |
| 5,579,414 | 11/1996 | Fast et al. | 382/254 |
| 5,613,146 | 3/1997 | Gove et al. | 395/800 |

*Primary Examiner*—Edward L. Coles, Sr.
*Assistant Examiner*—Stephen Brinich
*Attorney, Agent, or Firm*—Tracy L. Hurt

[57] ABSTRACT

A computer implemented method of preventing the reproduction of specks while reproducing an image including specks represented via source scan lines. According to the method, on a scan like-by-scan line basis, each source scan line signal is transformed into speckless output run lengths. A source run length is selected and examined by a processor to determine whether it represents part of a speck. If the selected source run length might represent a speck, the processor determines whether the selected source run length can be protected from removal. If it cannot, the length of the selected run length and its subsequent neighbor are added to the output run length. As a result, the speck represented by the selected run length disappears from the image by merger with adjacent source run lengths. On the other hand, if the selected source run length is protected from removal, an output run length is output that represents source run length (s) previous to the selected source run length. A new output run length is then defined whose length and color are the same as the selected source run length. Afterward, another source run length is designated as the selected source run length.

15 Claims, 7 Drawing Sheets

| | | | | | |
|---|---|---|---|---|---|
| 207 | 208 | | | | |
| 102 | 3 | 508 | | | $\tau_1$ |
| 102 | 3 | 508 | | | $\tau_2$ |
| 102 | 6 | 508 | | | $\tau_3$ |
| 102 | 6 | 508 | | | $\tau_4$ |
| 102 | 6 | 508 | | | $\tau_5$ |
| 102 | 9 | 508 | | | $\tau_6$ |
| 102 | 9 | 508 | | | $\tau_7$ |
| 102 | 9 | 508 | | | $\tau_8$ |
| 102 | 9 | 508 | | | $\tau_9$ |
| 233 | 234 | 236 | 238 | 240 | |
| 100 | | | | | $\tau_1$ |
| 100 | 3 | | | | $\tau_2$ |
| 100 | 6 | | | | $\tau_3$ |
| 100 | 6 | 1 | | | $\tau_4$ |
| 100 | 6 | 1 | 3 | | $\tau_5$ |
| 100 | 6 | 1 | 9 | | $\tau_6$ |
| 100 | 6 | 1 | 9 | 6 | $\tau_7$ |
| 100 | 6 | 1 | 9 | 514 | $\tau_8$ |
| 100 | 6 | 1729 | 9 | 514 | $\tau_9$ |

METHOD AND APPARATUS FOR REPRODUCING AN IMAGE WITHOUT SALT AND PEPPER SPECKS

FIELD OF THE INVENTION

The present invention relates to the processing of images represented by scan line signals. More particularly, the present inventions relates to a method of removing salt and pepper specks from scan line signals representing an image including salt and pepper specks.

BACKGROUND OF THE INVENTION

The CCITF Group 3 Standard dominates the transmission of black and white facsimile images today. According to the CCITT Group 3 Standard, facsimile images, or fax, are transmitted as a series of scan line signals. These scan line signals describe black and white images using an imaginary grid including a number of columns and a number of rows, or scan lines. The number of columns and scan lines within the imaginary grid varies depending upon image resolution. Each scan line signal represents a single horizontal scan line across an image and includes a number of picture elements, or pixels, each of which possesses a color and a location within the imaginary grid. Pixels are not represented individually by scan line signals. Instead, scan line signals represent groups of contiguous pixels of the same color. Pixels so grouped are referred to as a run length, and the signals representing run lengths are called run length signals. Run lengths thus possess color, length in pixels, and position within the imaginary grid. By convention each scan line describes a row from the left to right of the imaginary grid. Also, by convention each scan line signal includes alternating runs of black and white, begins with a run length of white pixels, and ends with an end-of-line (EOL) signal. As a result of these conventions, there is no need to indicate the color or position of each run length of a scan line signal. For example, "0, 100, 25 . . . " describes a scan line that starts with a run of 0 white pixels, followed by a run of 100 black pixels, followed in turn, by a run of 25 white pixels.

Run length signals within a scan line are typically encoded using techniques such as Huffman encoding. The encoding and decoding of run lengths has no impact upon the method of removing salt and pepper specks to be described and, therefore, will not be described.

Documents transmitted via fax may include salt and pepper specks if error correction is not used to correct for transmission loss and distortion. Salt and pepper specks are small black and white marks sprinkled across a page. Together they are referred to as specks.

SUMMARY OF THE INVENTION

A method of removing specks from an image represented via scan line signals will be described. On a scan line-by-scan line basis, a processor transforms each source scan line signal into a string of output run length signals, from which the image can be reproduced without salt and pepper specks. The transformation of a source scan line begins by setting the length of an output run length equal to the length of the first run length of the source scan line. Next, the second run length of the source scan line is designated as the selected run length. Thus, by definition the output run length represents run length(s) prior to the selected run length and is opposite in color. The processor then determines whether the selected run length ends the output run length by examining the size of the selected run length. If the selected source run length might represent part of a speck, the processor then determines whether the selected source run length is part of a larger image. If it is not, the processor prevents reproduction of the selected source run length by adding its length and the length of its neighboring run length to the output run length. This removes the speck represented by the selected source run length by merging it into adjacent run lengths. On the other hand, if the selected source run length is not part of a speck, it ends the current output run length, which is output, and a new output run length is defined having the same color and length as the selected source run length.

Other objects, features, and advantages of the present invention will be apparent from the drawings and the detailed description that follows.

BRIEF DESCRIPTION OF THE DRAWINGS

The present invention is illustrated by way of example and not by way of limitation in the figures of the drawings. In the drawings similar references indicate similar elements.

FIG. 4 illustrates exemplary contents of scan line storage and cumulative size storage.

DETAILED DESCRIPTION

Figure 1:
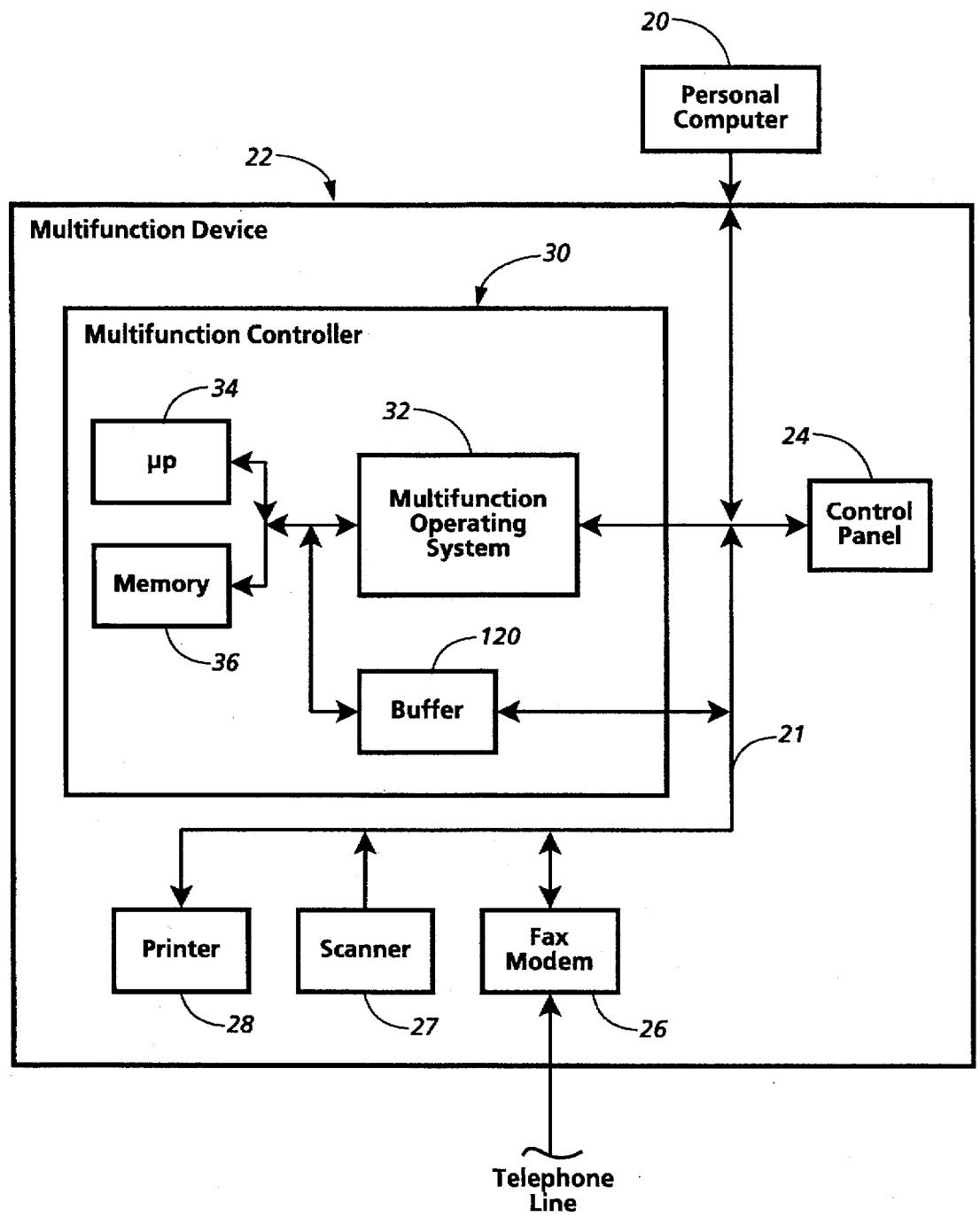
FIG. 1 is a block diagram of a multifunction device that removes salt and pepper specks during image reproduction.

FIG. 1 illustrates multifunction device 22, which enables a user of personal computer 20 to move information easily between paper and electronic media. Multifunction device 22 also produces documents without salt and pepper specks by transforming source scan line signals including salt and pepper specks into speckless output scan line signals. Briefly described, removal of salt and pepper specks from a source scan line is a multistep process that begins by setting the length of an output run length equal to the length of the first run length of the source scan line. Next, the second run length of the source scan line is designated as the selected run length. These definitions have two ramifications. First, the output run length represents source run length(s) previous to the selected run length. Second, the output run length and the selected run length are opposite in color. Multifunction controller 30 outputs the output run length when the selected run length is not part of a speck; i.e., when the selected run length ends the output run length by forcing a color change. Afterward, the output run length is redefined so that it represents the length and color of the selected run length. Finally, another source run length is designated the selected run length. On the other hand, when the selected run length represents part of a speck, then the length of both it and the subsequent source run length are added to the length of the output run length. As a consequence, when the output run length is finally output, the speck disappears, absorbed into a larger run length.

Prior to beginning a more detailed discussion of the present invention, consider an environment in which the present invention is intended to operate. Multifunction device 22 prints documents, copies documents, as well as transmitting and receiving facsimile documents. Multifunction device 22 performs these tasks via control panel 24, fax modem 26, scanner 27, printer 28, multifunction controller 30, and buffer 120. Though not shown, multifunction device 22 may also include a display device such as a cathode ray tube (CRT), or monitor. Multifunction controller 30 controls the operation and cooperation of input/output devices 24, 26, 27, and 28 using multifunction operating system 32. Multifunction operating system 32 selects appropriate command sequences, which it passes to processor 34 for execution. Multifunction operating system 32 may be realized as software stored within a memory device. Preferably, the software used to realize multifunction operating system 32 is Microsoft At Work™.

Fax modem 26, scanner 27, printer 28, multifunction controller 30, and buffer 120 represent the documents that they handle using scan line signals. Scanner 27 generates scan line signals from markings on a document, while printer 28 marks images on a marking medium using scan line signals. Fax modem 26 and multifunction controller 30 use scan line signals received from personal computer 20, telephone lines, or scanner 27 to enable movement of information between electronic media and marking media, like paper. Buffer 120 temporarily stores scan line signals while salt and pepper specks are being removed to transform source scan line signals into speckless output run lengths forming output scan line signals.

The method of removing salt and pepper specks to be described is not limited to use in multifunction devices; it can be used in conjunction with any device including memory and a processor that uses scan line signals to manipulate black and white images. Thus, for example, the method may be implemented within personal computer 20, a fax machine, or within a sophisticated copy machine. Additionally, the speckless scan lines generated by the present method can be used prior to faxing a document or prior to performing optical character recognition to transform the raster representation of a document into an ASCII representation.

The functionality of multifunction operating system 32 is enhanced by calls to additional processes, including the present method. Those processes are preferably realized using instructions executed by processor 34 and stored in object code form within memory 36. Memory 36 can be realized using solid state memory devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories.

Figure 2:
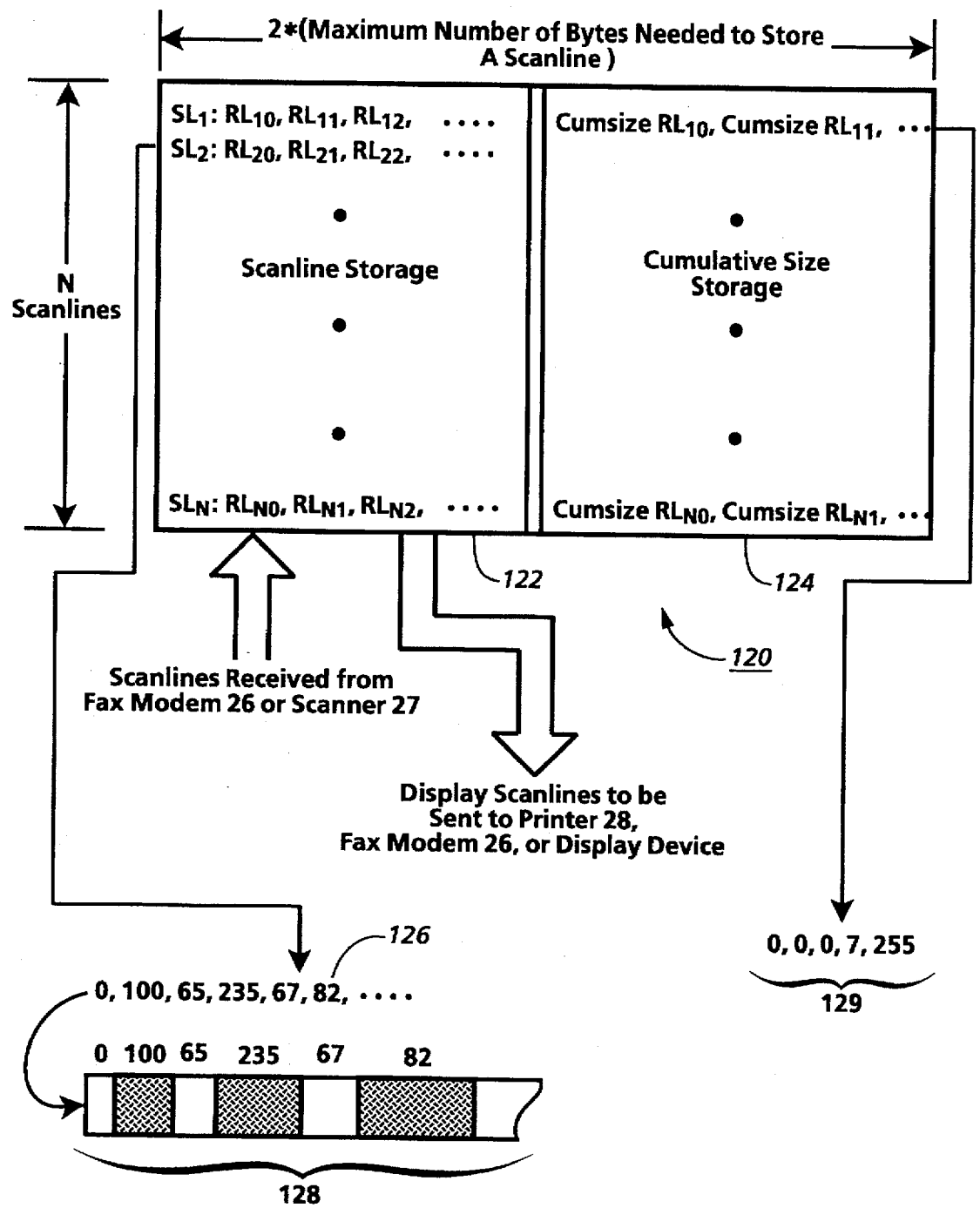
FIG. 2 illustrates a buffer including scan line storage and cumulative size storage.

Buffer 120 facilitates removal of salt and pepper specks by temporarily storing a set of adjacent source scan line signals prior to their transmission to a reproduction device. As used herein, a reproduction device refers to any device that can reproduce an image from scan line signals. Reproduction devices include fax machines, printers and display monitors. FIG. 2 illustrates buffer 120, which can be realized separately or, alternatively, as part of memory 36. Buffer 120 stores scan line signals received from fax modem 26 or scanner 27. Buffer 120 is a first-in, first-out buffer. Scan line signals are input into buffer 120 until it is full, then the source scan line signal input first is transformed and output a run length at a time.

The length of buffer 120 is a design choice dependent upon the amount of available memory in the system in which the method of removing specks is being implemented and the size of specks to be removed. The length of buffer 120 can be as little as required to store three source scan lines if memory is severely constrained, though buffering of at least a number of scan lines equal to the maximum speck size plus one is preferred. The width of buffer 120 should be twice the maximum number of bytes necessary to store a single scan line signal. This permits division of buffer 120 into two areas, scan line storage 122 and cumulative size storage 124.

As indicated by its name, scan line storage 122 stores scan lines. Scan line signals consist of, and are stored as, a string, or list, of numerous run length signals. Run lengths possess color, position, and length, yet, given facsimile conventions can be represented and stored simply as a number indicative of their length. Thus, each scan line entry within scan line storage 122 represents a string of binary numbers; however, exemplary scan line 126 illustrates a string of run lengths in base 10 form. While scan line storage 122 stores run lengths as binary numbers, for illustrative purposes in the following figures the contents of scan line storage 122 are represented by a series of white and black rectangles, above which is a base 10 number indicative of their length in pixels. Exemplary scan line 126 is represented in this fashion by scan line 128.

Cumulative size storage 124 stores the cumulative size of each run length and is used to flag run lengths for removal, as well as flag run lengths as protected from removal. A single arbitrary value can be used to flag run lengths as protected from removal; however, any cumulative size value greater than the maximum speck will protect the associated run length from removal. In one embodiment, that arbitrary value is equal to the maximum value cumulative size storage 124 is capable of associating with any one run length. Thus, if cumulative size storage 124 includes a byte of storage space for each run length within a scan line then 255 (base 10) would be the arbitrary value that flags a run length as protected from removal. Any value less than the maximum speck size flags a run length for removal. An exemplary entry in cumulative size storage 124 is represented by entry 129.

Figure 3:
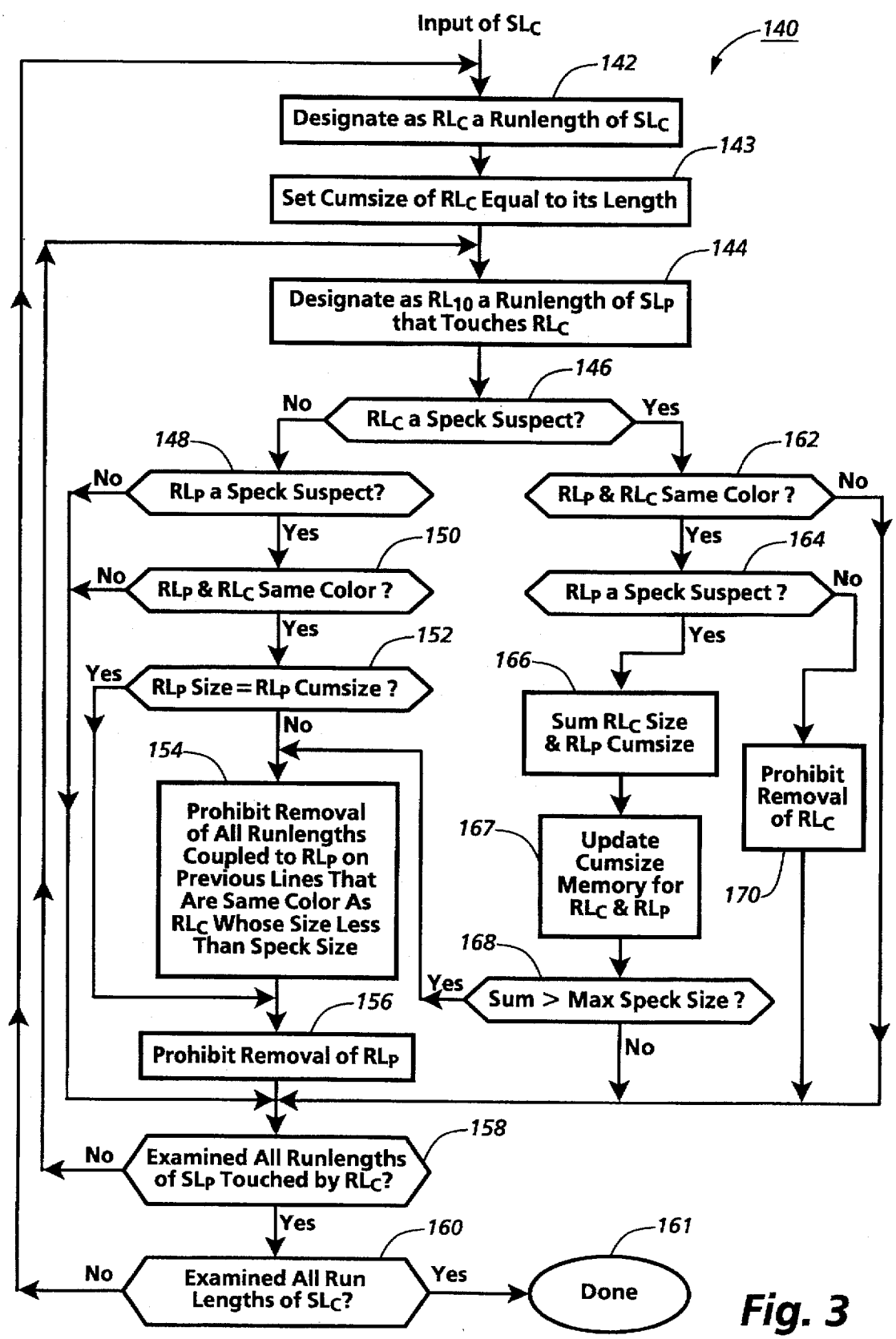
FIG. 3 is a detailed flow diagram of a method of identifying salt and pepper speck suspects as source scan line signals are input to a buffer.

The method of removing salt and pepper specks is preferably divided into two processes, one executed as source scan line signals are input to buffer 120 and the other executed as speckless run length signals are output from buffer 120. FIG. 3 illustrates in detail process 140 used to input source scan lines to buffer 120. Process 140 identifies short run lengths within a source scan line and protects those run lengths from removal, if possible. In general, run lengths require protection from removal when their length is less than a maximum speck size or when they have not yet been protected from removal. Process 140 also assists in the identification of short source run lengths that should be removed because they represent part of a salt or pepper speck. Process 140 only assists in the removal decision because the final decision is made by another process.

Consider the operation of process 140 when a scan line is input to buffer 120, which stores only one other previously input scan line. FIG. 4 illustrates only those potions of scan lines 200, 220, and 260 helpful to the discussion of the operation of process 140. FIG. 4 also illustrates how the contents of cumulative size storage 124 changes during the execution of process 140. The contents of cumulative size storage 124 are indicated at seven different times, which are designated as $\tau_1$, $\tau_2$, $\tau_3$, $\tau_4$, $\tau_5$, $\tau_6$, $\tau_7$, $\tau_8$, and $\tau_9$.

Processor 34 begins execution of process 140 with step 142 in response to the input of source scan line 220, designated $SL_c$, to buffer 120. During step 142, processor 34 selects a source run length within $SL_c$ 220, for examination and designates that run length as $RL_c$. Processor 34 first designates run length 222 as $RL_c$. The run length designated as $RL_c$ will be examined during subsequent steps. Preferably, designation of run lengths as $RL_c$ begins with the run length of $SL_c$ representing at the leftmost edge of the image and proceeds sequentially to the right. Other methods of designating run lengths within a scan line are possible and compatible with the present invention.

After completing step 142, processor 34 sets the cumulative size of $RL_c$ equal to its length. Thus, at $\tau_1$ a value of 100 is stored in memory location 207.

Processor 34 advances from step 143 to step 144 to begin attempts to either protect $RL_c$ from removal or to protect other run lengths from removal. Both efforts involve comparing $RL_c$ to another source run length that is "touched" by $RL_c$ and forms part of an immediately adjacent source scan line. As used herein, two run lengths "touch" each other when they occupy adjacent scan lines and they occupy common columns or adjacent columns within the imaginary grid. For example, within scan line 200 run length 204 touches run lengths 224, 226, and 228 of adjacent scan line 220. Most scan lines are sandwiched between two immediately adjacent scan lines; one above and one below. Only one of the two immediately adjacent scan lines is stored within buffer 120 at the time a new scan line, $SL_c$, is input to buffer 120. That scan line is referred to as the previous scan line, $SL_p$, because it is input to buffer 120 previous to $SL_c$. Thus, scan line 200 is designated $SL_p$ when scan line 220 is designated $SL_c$. Accordingly, during step 144 processor 34 selects a run length from among those forming $SL_p$ 200 and touching $RL_c$ and designates that run length as $RL_p$. Only run length 202 on scan line 200 meets these criteria when run length 222 is designated as $RL_c$. After designating run length 202 as $RL_p$, processor 34 branches to step 146 from step 144.

During step 146 processor 34 determines whether the run length currently designated as $RL_c$ is a speck suspect by examining the length of $RL_c$ 222. Any source run length less than the maximum speck size is a speck suspect. The size selected as the maximum speck size is a design choice that depends upon the largest font size in which the designer is willing to risk removal periods and dots over "i"s as salt or pepper specks. Stated another way, the maximum speck size preferably is chosen to be less than the length of a dot or period of the smallest font size in which the designer does not wish to lose periods or dots. In one embodiment, the maximum speck size is set equal to eight pixels.

Processor 34 determines during step 146 that $RL_c$ 222 is not a speck suspect because its length, 100 pixels, is greater than the maximum speck size. Protected by its size from removal, $RL_c$ 222 may be able to protect $RL_p$ from removal. Processor 34 advances from step 146 to step 148 to investigate that possibility.

Processor 34 determines whether $RL_p$ 202 requires protection from removal during step 148 by comparing the length of $RL_p$ 202 in pixels to the maximum speck size. $RL_p$ 202 requires no protection from removal because its length, 102 pixels, is greater than the maximum speck size. Processor 34 responds to this discovery by branching from step 148 to step 158.

Upon beginning execution of step 158, processor 34 has done what can be done to protect $RL_p$ 202 from removal using $RL_c$ 222 (or vice versa if processor 34 reached step 158 via steps 162–170). Processor 34 now turns its attention to the possibility of protecting from removal other source run lengths on $SL_p$ 200 touched by $RL_c$ 222. During step 158 processor 34 determines whether all run lengths on $SL_p$ 200 touched by $RL_c$ 222 have been examined. Processor 34 determines that they have been because $RL_c$ 222 touches only $SL_p$ 202 on scan line 200. That is to say, run length 202 is the only run length on scan line 200 that occupies any of the columns also occupied by $RL_c$ 222 or columns adjacent to $RL_c$ 222. As a result, processor 34 pauses its efforts to extend the protection of $RL_c$ to other source run lengths and advances to step 160 from step 158.

Processor 34 determines whether all run lengths within the current source scan line, $SL_c$ 220, have been examined during step 160. As run lengths 224, 226, 228, and 230 in source scan line 220 have not yet been examined, processor 34 branches back to step 142 to select the next source run length for examination.

Processor 34 next designates source run length 224 as $RL_c$. Next, during step 143 at $\tau_2$ the cumulative size of $RL_c$ is set equal to its length of 3. From step 143 processor 34 advances to step 144 where a run length on the previous source scan line, $SL_p$ 200, touched by $RL_c$ 224 is designated as $RL_p$. Run lengths 202 and 204 both touch $RL_c$ 224. Assume that processor 34 designates source run length 202 as $RL_p$ during the first pass through step 144. Processor 34 then advances to step 146.

Having designated $RL_p$ and $RL_c$, processor 34 decides during step 146 whether $RL_c$ 224 requires protection or is capable of protecting other source run lengths. Processor 34 discovers $RL_c$ 224 requires protection from removal because its length, 3 pixels, is less than the maximum speck size. Processor 34 responds by branching to step 162.

With step 162, processor 34 turns its attention to whether $RL_p$ 202 can protect $RL_c$ 224 from removal. $RL_p$ 202 can protect $RL_c$ 224 from removal only if the two source run lengths are the same color. Thus, processor 34 determines during step 162 whether $RL_p$ 202 is the same color as $RL_c$. This can be done by determining whether both source run lengths are odd entries or even entries within their source scan lines stored in scan line storage 122 because, by convention, all scan lines begin with the same color, white, and run length color alternates within a scan line between black and white. In this case, $RL_p$ 202 is an odd entry within source scan line 200 while $RL_c$ 224 is an even entry within scan line 220. Thus, $RL_p$ 202 is not the same color as $RL_c$ 224 and cannot protect $RL_c$ 224 from removal. Processor 34 responds to this discovery by branching to step 158 from step 162.

Processor 34 discovers during step 158 that not all source run lengths on $SL_p$ 200 touched by $RL_c$ 224 have been examined. Processor 34 responds by branching back to step 144 and designating run length 204 as $RL_p$. As during its last pass through step 146, processor 34 branches to step 162 because $RL_c$ 224 is a speck suspect.

Processor 34 turns it attention to whether $RL_p$ 204 can provide the protection required by $RL_c$ 224 with step 162. Processor 34 determines that $RL_p$ 204 can increase the cumulative size of $RL_c$ 224 during step 162 because the two source run lengths are the same color. Thus, processor 34 advances to step 164 to determine whether the size of $RL_p$ 204 is adequate by itself to prevent the removal of $RL_c$ 224. With a length less than the maximum speck size, $RL_p$ 204 by itself may not be capable of protecting $RL_c$ 224 from removal. Based upon this discovery, processor 34 advances to step 166. Processor 34 sums together the length of $RL_c$ 224 and the cumulative size of $RL_p$ 204 during step 166.

That sum is 6 pixels. Branching to step 167, processor 34 notes the increased cumulative size of source run lengths 224 and 204 by storing the value 6 in memory locations 208 and 234 at $\tau_3$. Processor 34 next determines during step 168 whether the sum is adequate to protect either run length 204 or 224 from removal. It is not because the sum is less than the maximum speck size. Processor 34 responds by branching to step 158 from step 168.

Processor 34 discovers during step 158 that all run lengths on $SL_p$ 200 touched by $RL_c$ 224 have been examined. Processor 34 responds by turning its attention to whether further examination of the current source scan line $SL_c$ 220 is necessary. During step 160 processor 34 discovers that not all run lengths within $SL_c$ 220 have been examined. Processor 34 responds by branching back up to step 142 to select the next run length within $SL_c$ 220 for examination.

Processor 34 designates source run length 226 as $RL_c$ during step 142. The size of $RL_c$ 226, 1, is stored in memory location 236 at $\tau_4$. From step 143 processor 34 advances to step 144. Run length 204 is designated as $RL_p$ during step 144. Processor 34 then discovers during step 146 that $RL_c$ 226, with a length of 1 pixel, requires protection from removal. Efforts to protect $RL_c$ 226 from removal begin with processor 34 branching to step 162 from step 146. Processor 34 discovers that $RL_p$ 204 cannot protect $RL_c$ 226 from removal during step 162 because the two source run lengths are different colors. Processor 34 advances to step 158 in response.

Processor 34 discovers during step 158 that all source run lengths on $SL_p$ 200 that touch $RL_c$ 226 have already been examined. As a consequence, processor 34 is free to turn its attention to another source run length if all source run lengths within $SL_c$ 220 have been examined. Because all source run lengths within $SL_c$ 220 have not been examined, processor 34 returns to step 142.

Processor 34 designates source run length 228 as $RL_c$ during step 142 and stores a value of 3 in its associated cumulative size memory location 238 at $\tau_5$. Next, processor 34 designates source run length 204 as $RL_p$ during step 144. It is determined during step 146 that $RL_c$ 228 requires protection from removal because its length is 3 pixels, less than the maximum speck size. Processor 34 advances to step 162 from step 146 to begin efforts to protect $RL_c$ 228 from removal, if possible. $RL_p$ 204 may be able to protect $RL_c$ 228 from removal because the two source run lengths are the same color. This fact causes processor 34 to branch to step 164 from step 162. Processor 34 determines during step 164 that the length of $RL_p$ 204 is insufficient to protect $RL_c$ 228 from removal. As a consequence, processor 34 branches to step 166. Processor 34 determines the cumulative size of $RL_c$ 228 and $RL_p$ 204 by summing the length of $RL_c$ with the cumulative size of $RL_p$, stored in memory location 238. Nine pixels is the sum, which during step 167 is stored to memory locations 208 and 238 at $\tau_6$. Processor 34 advances to step 168 and compares the sum to the maximum speck size during step 166 to determine if the cumulative size of $RL_c$ 228 is adequate to protect from removal run lengths on scan lines previous to $SL_p$. The cumulative size of $RL_c$ exceeds the maximum speck size and is adequate to protect other run lengths from removal, so processor 34 advances to step 154.

Processor 34 searches recursively during step 154 for run lengths coupled to $RL_p$ on scan lines previous to $SL_p$ that require protection from removal. This recursive search continues until all run lengths coupled to $RL_c$ have been wholly terminated, or a scan line is encountered on which all unterminated run lengths coupled to $RL_c$ do not require protection. Run lengths can be wholly or partially terminated by touching a run length on an adjacent scan line of the opposite color. For example, run length 204 partially terminates run length 226 because run length 204 does not touch the entire length of run length 226. In contrast, run length 204 wholly terminates run length 226.

In the example currently being discussed, buffer 120 does not store a scan line that was input previous to scan line 200. As a consequence, processor 34 cannot identify any run length of interest during step 154. When buffer 120 does store scan lines input previous to the scan line designated $SL_p$ processor 34 locates source run lengths coupled to $RL_p$ and protects them from removal, if necessary, by writing a value greater than the maximum speck size in the associated memory locations within cumulative size storage 124. Because processor 34 only examines source scan lines previous to $SL_p$ during step 154, processor 34 will not discover run lengths that increased the cumulative size of $RL_p$ when those run lengths form part of scan lines input to buffer 120 subsequent to $SL_p$. This includes run lengths within $SL_c$. For example, the cumulative sizes of $RL_p$ 204 and $RL_c$ 228 were both increased by the length of run length 224, which forms part of scan line 220; however, run length 224 will not be identified at this point as a run length coupled to $RL_p$ 204 that should be protected from removal.

Processor 34 advances to step 156 after completing execution of step 154. At that time processor 34 protects $RL_p$ 204 from removal, if necessary, by writing a value greater than the maximum speck size into memory location 208. In this case, such action is unnecessary. Processor 34 then branches to step 158.

Processor 34 again turns its attention to $RL_c$ during step 158. Processor 34 decides to conduct further investigations with respect to $RL_c$ 228 because not all source run lengths on $SL_p$ 200 that touch $RL_c$ 228 have been examined. Accordingly, processor 34 advances to step 144 and designates run length 206 as $RL_p$. Next during step 146, processor 34 determines whether $RL_c$ 204 requires protection from removal or can protect others from removal. Unlike previous passes through step 146, processor 34 discovers that the cumulative size of $RL_c$ 228 at $\tau_6$ may enable it to protect $RL_p$ 206 and other run lengths from removal. Processor 34 responds by branching to step 148 from step 146.

A cumulative size greater than the maximum speck size is not determinative of whether $RL_c$ 228 may protect $RL_p$ 206 from removal. $RL_p$ must require protection from removal and must be the same color as $RL_c$. Processor 34 determines during step 148 that $RL_p$ 206 does not need protection from removal because with a length of 508 pixels $RL_p$ 206 is not a speck suspect. Processor 34 branches to step 158.

Again processor 34 turns its attention to whether to conduct further investigations with respect to $RL_c$ 228. No further investigations with respect $RL_c$ 228 need be conducted to because both run lengths on $SL_p$ 200 that touch $RL_c$ 228 have been examined. Processor 34 responds to this discovery by branching to step 160 from step 158. During step 160 it is determined whether all run lengths within $SL_c$ 220 have been examined. Run length 230 has not been evaluated yet, so processor 34 branches back to step 142 from step 160.

Run length 230 is designated $RL_c$ during step 142. During subsequent step 143 the length of $RL_c$ 230 is stored into cumulative size memory location 240. Thus, processor 34 writes a value of 6 into memory location 240 at $\tau_7$. Run length 206 is designated $RL_p$ during step 144. Processor 34 then determines during step 146 whether $RL_c$ 230 requires protection from removal or is capable of protecting from removal other run lengths. $RL_c$ 230 requires protection from removal because its length is just 6 pixels, less than the maximum speck size. Processor 34 responds by advancing to step 162. While executing that step, processor 34 discovers $RL_p$ 206 may be able to protect $RL_c$ 230 from removal because the two source run lengths are the same color. Subsequently, during step 164, it is discovered that $RL_p$ 206 is large enough to protect $RL_c$ 230. Processor 34 responds by branching to step 170 from 164. During step 170 processor 34 protects $RL_c$ 230 from removal by storing a value larger than the maximum speck size in memory location 240. That value may be the sum of the length of $RL_c$ 230 and the cumulative size of $RL_p$ 206, the largest value memory location 240 is capable of storing, or any arbitrary value greater than the maximum speck size. Thus, for example, processor 34 may store a value of 514 in memory location 240 at $\tau_8$.

Processor 34 advances to step 158 from step 170. During that step processor 34 discovers that all run lengths on $SL_p$ touching $RL_c$ 226 have been examined. Advancing to step 160 from step 158, processor 34 next discovers it has examined all run lengths within $SL_c$. Its task complete, processor 34 branches to step 161.

One other case handled by process 140 remain to be discussed, which is illustrated by the input of scan line 260 to buffer 120 subsequent to the input of scan line 220. Processor 34 begins execution of process 140 with step 142 and the designation of source run length 262 as $RL_c$. Eventually, during one of its passes through step 144, processor 34 advances to step 146 and length 226 as $RL_p$. From step 144, processor 34 advances to step 146 and discovers $RL_c$ 262 is capable of protecting other run lengths from removal. Processor 34 next determines whether $RL_p$ 226 needs protection and can be protected by $RL_c$ by executing steps 148 and 150. $RL_p$ 226 both requires protection from removal and can be protected by $RL_c$ 262. Prior to protecting $RL_p$ 226, processor 34 makes a quick assessment of whether there are source run lengths coupled to $RL_p$ 226 that also require protection from removal. Processor 34 does so by comparing the length of $RL_p$ 226 to its cumulative size. At $\tau_8$ the two are equal, indicating that $RL_p$ 226 is not coupled to other source run lengths. As a consequence, processor 34 need only protect $RL_p$ 226 from removal. Processor 34 does so by branching to step 156 and at $\tau_9$ storing to memory location 236 a value greater than the maximum speck size, 1729, or the largest value memory location 236 is capable of storing.

The previous discussion of process 140 illustrates that its execution prevents the removal of some, but not all, source run lengths whose lengths are less than the maximum speck size but nonetheless should not be removed. Process 140 does not prevent the removal of all such source run lengths because it examines only previous source scan lines. Examination of subsequent source scan lines is necessary to prevent the removal of all source run lengths that should not be removed.

Figure 5A:
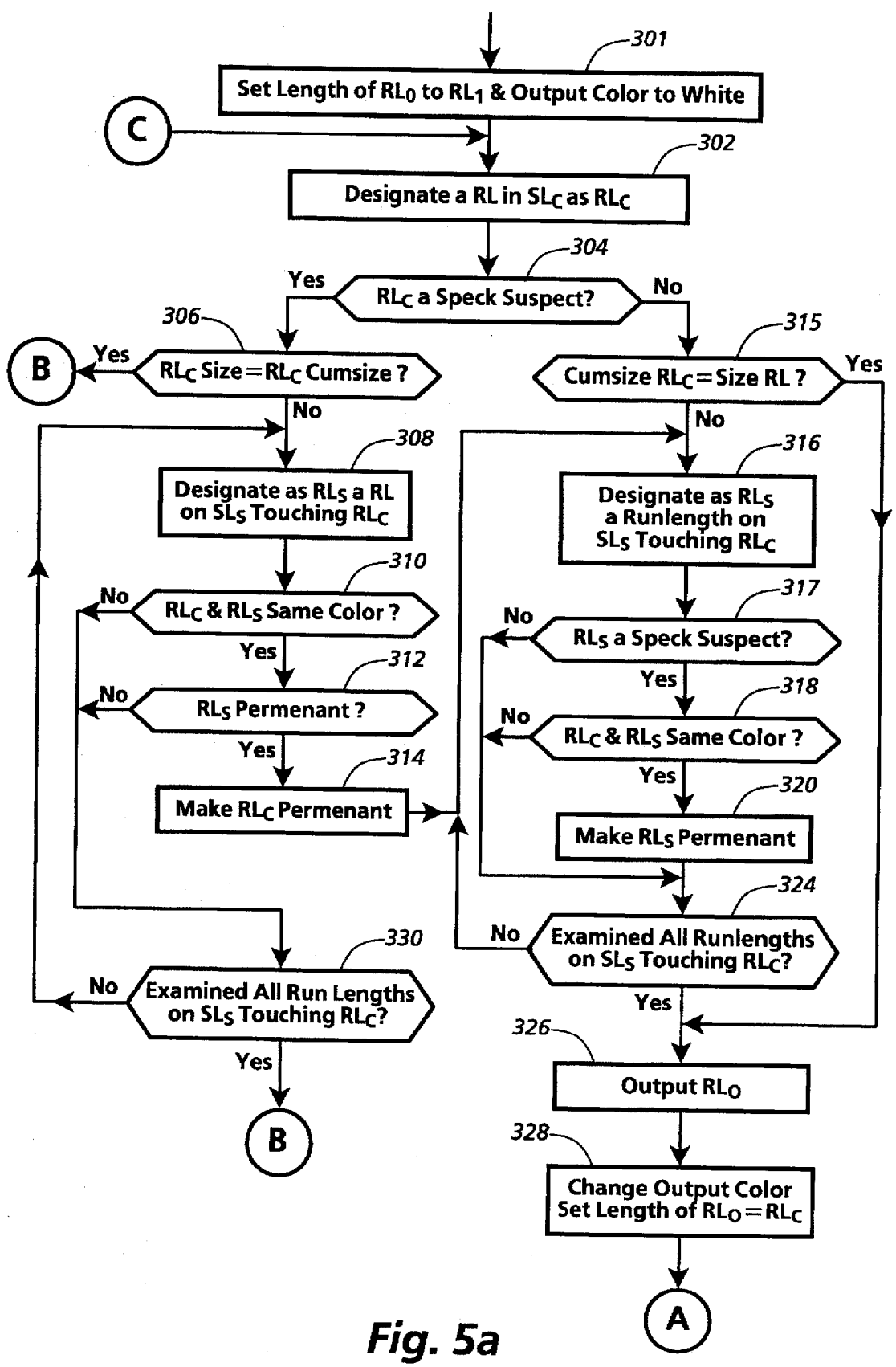
FIG. 5 illustrates a method of identifying salt and pepper specks and removing them prior to outputting a scan line from the buffer.
Figure 5B:
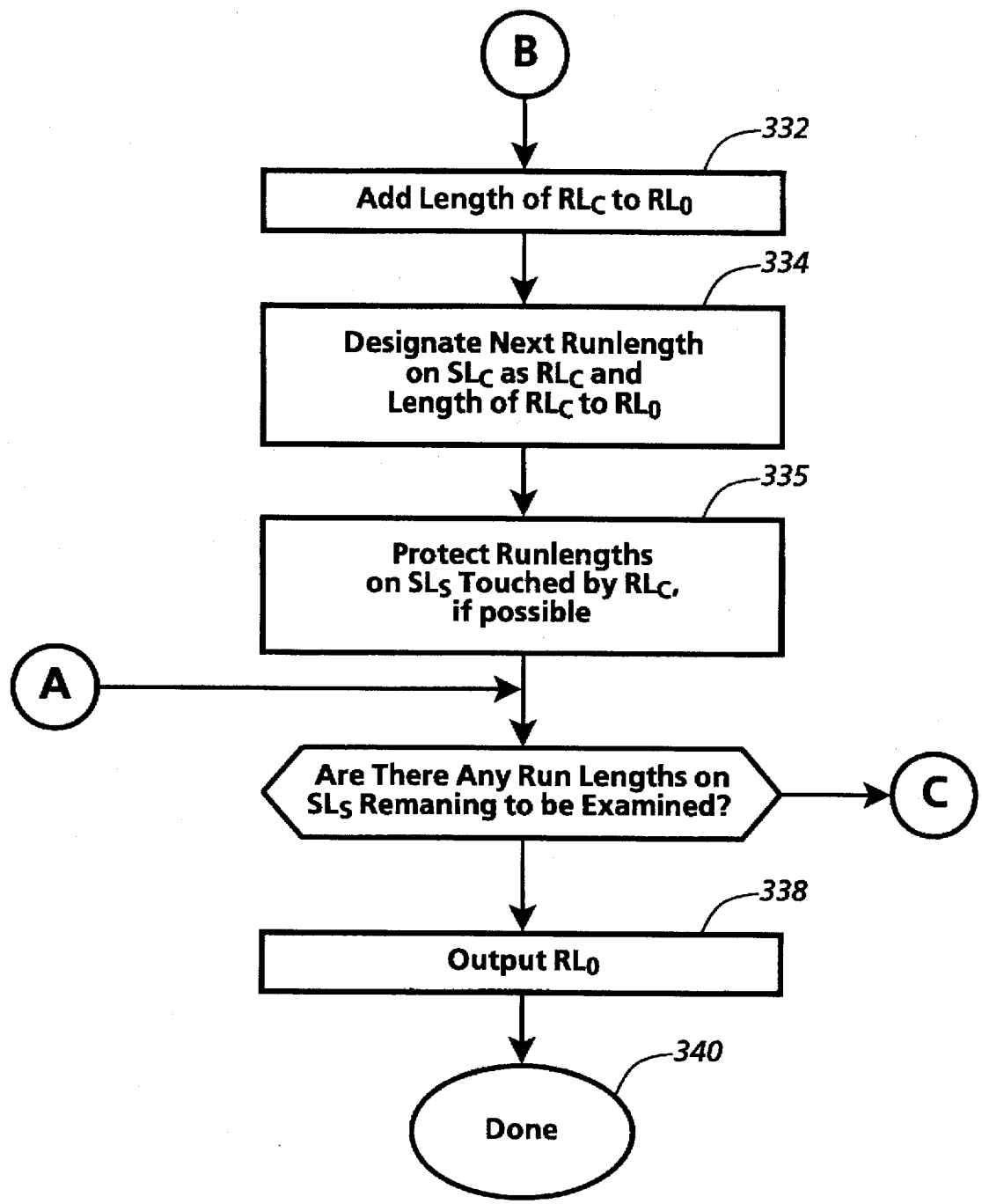

Process 300 transforms a source scan line into a string of binary numbers representing a string of speckless output run lengths, which form an output scan line. Process 300 is illustrated in flow diagram form in FIG. 5. Briefly described, execution of process 300 is initiated by a request to output a scan line from buffer 120. In response, processor 34 defines an initial output run length, $RL_o$, representative of the first run length of the source scan line to be output and designates as $RL_c$ the second source run length. Processor 34 then determines during step 304 whether $RL_c$ requires protection from removal or can protect other run lengths from removal. If $RL_c$ is permanent, processor 34 executes steps 315–320 in its efforts to protect touching run lengths on the subsequent scan line. Further, if $RL_c$ is permanent then its leading edge ends one output run length and begins another. Consequently, during steps 326–328 processor 34 outputs the current value of $RL_o$ and then sets $RL_o$ equal to the length of $RL_c$. By convention, the color of this new $RL_o$ differs from that of the $RL_o$ just output. Processor 34 then designates another source run length as $RL_c$. On the other hand, if it is discovered during step 304 that $RL_c$ is not permanent, processor 34 branches to step 306 to begin searching the subsequent scan line for a touching run length that can make $RL_c$ permanent. Should execution of steps 306–314 make $RL_c$ permanent then processor 34 branches to step 315 and treats $RL_c$ accordingly. On the other hand, should execution of steps 306–314 fail to make $RL_c$ permanent, processor 34 branches to step 332 to begin the process of removing $RL_c$ from the output scan line. First, processor 34 adds to $RL_o$ the length of $RL_c$ and the length of the source run length subsequent to $RL_c$. This removes the source run length represented by $RL_c$ by merging it with adjacent source run lengths. Afterward, processor 34 designates another source run length as $RL_c$. Processor 34 continues executing process 300 until all source run lengths within the scan line being output have been processed.

Execution of process 300 by processor 34 begins when a source scan line, designated $SL_c$, is selected to be output from buffer 120. Processor 34 begins by initializing $RL_o$ during step 301. The value of $RL_o$ is set equal to the length of the first source run length of $SL_c$. When finally output, the output run length associated with the first source run length will be the first of the output scan line. Consequently, the first $RL_o$ output will be white. Processor 34 then advances to step 302.

During step 302, processor 34 selects a source run length from $SL_c$ and designates that run length $RL_c$. The first pass through step 302, the second source run length is designated as $RL_c$. As a result of this initial designation of $RL_c$ and $RL_o$, $RL_o$ represents source run length(s) previous to $RL_c$. As used herein, a run length is "previous" to $RL_c$ when that run length is handled by process 300 prior to $RL_c$. For example, when process 300 is outputting scan line 220 of FIG. 4 proceeding from left to right, then run lengths 222 and 224 are previous to run length 226. When process 300 outputs scan lines proceeding from right to left then run length 226 is previous to run lengths 222 and 224, which are subsequent to run length 226. $RL_o$ remains previous to $RL_c$ throughout process 300, even as the two quantities change. As a result of the relationship maintained between $RL_o$ and $RL_c$, the primary concern of process 300 is whether $RL_c$ represents the end of one output run length $RL_o$ and the beginning of another. $RL_c$ marks the transition between two differently colored output run lengths only when $RL_c$ is permanent.

Figure 6:
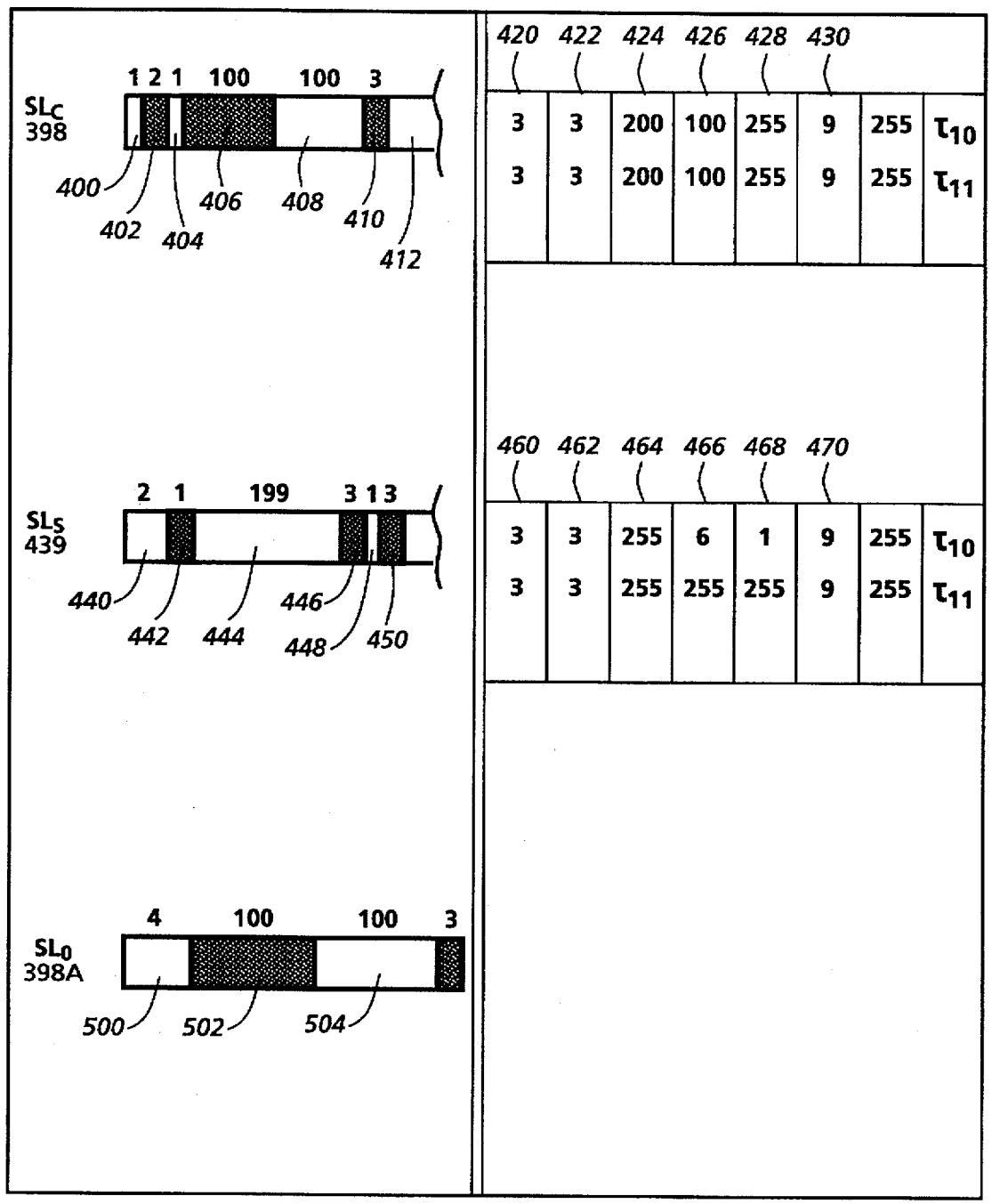
FIG. 6 illustrates exemplary contents of scan line storage and cumulative size storage during execution of the method of FIG. 5.

FIG. 6 aids the discussion of step 302 and subsequent steps. FIG. 6 illustrates a portion of scan line 398, which is to be output from buffer 120. Processor 34 designates run length 402 as $RL_c$ the first pass through step 302. Afterward, processor 34 advances to step 304.

Processor 34 determines whether $RL_c$ 402 requires protection from removal or can protect other source run lengths from removal during step 304. Processor 34 makes this determination based upon either the length of $RL_c$ or the cumulative size of $RL_c$, whichever is necessary. Size alone is sufficient to protect from removal those source run lengths whose length exceeds the maximum speck size. For source run lengths like $RL_c$ 402, whose length is less than the maximum speck size, their cumulative size must be examined. Memory location 422 of cumulative size storage 124 stores a value indicative of the cumulative size of run length 402. The value stored in memory location 422 indicates that run length 402 is not protected from removal because the value is not greater than the maximum speck size. Thus, processor 34 determines $RL_c$ 402 requires protection from removal and branches to step 306 to see if such protection can be found.

Processor 34 attempts to locate protection for $RL_c$ 402 on the scan line subsequent to $SL_c$. Processor 34 determines during step 306 whether there is even a possibility of protection for $RL_c$ 402 to be found on the subsequent source scan line, $SL_s$ 439, by comparing the cumulative size of $RL_c$ to its length. If the two are equal, no source run length on $SL_s$ 439 can save $RL_c$ from removal. If such a source run length exists the cumulative size of $RL_c$ would have been increased to a value greater than its length when $SL_s$ 439 was input into buffer 120. Processor 34 discovers during step 306 that the cumulative size of $RL_c$ 402 exceeds its length. Processor 34 responds by advancing to step 308.

Processor 34 begins its search in step 308 by designating as $RL_s$ one of the source run lengths of $SL_s$ 439 that touches $RL_c$ 402. Assume that source run length 440 is designated as $RL_s$. $RL_s$ 440 can protect $RL_c$ 402 from removal only if the two source run lengths are the same color and $RL_s$ 440 is protected from removal, i.e., permanent. This differs slightly from the standard used during process 140. During process 140, whether protected itself from removal, one source run length could increase the cumulative size of another source run length of the same color. As a result, during execution of process 140 $RL_s$ increased the cumulative size of $RL_c$ without protecting $RL_c$ from removal. Changing the cumulative size of $RL_c$ during process 300 is worthwhile only if $RL_s$ has been made permanent and can now make $RL_c$ permanent. Processor 34 discovers during step 310 that $RL_c$ 402 and $RL_s$ 440 are different colors. $RL_s$ 440 cannot protect $RL_c$ 402 from removal. Processor 34 responds by branching to step 330.

During step 330, processor 34 determines whether all source run lengths on $SL_s$ 439 touching $RL_c$ 402 have already been considered. As they have not, processor 34 returns to step 308 and designates the next source run length, 442, as $RL_s$. During step 310 processor 34 discovers $RL_s$ 442 may be able to protect $RL_c$ because the two are the same color. Processor 34 finds during step 312 that $RL_s$ 442 is not permanent by examining its cumulative size memory location 462, which stores a value of 3. $RL_s$ 442 cannot protect $RL_c$ 402 from removal. Consequently, processor 34 advances to step 330 from step 312.

Processor 34 discovers during step 330 that all source run lengths on $SL_s$ 439 touching $RL_c$ 402 have been examined. $RL_c$ 402 still is not permanent so it will be removed in subsequent steps. Processor responds by advancing to step 332 from step 330.

Processor 34 adds the length of $RL_c$ 402 to the value of $RL_o$ during step 332. In the following step, processor 34 designates as $RL_c$ the run length subsequent to run length 402, run length 404. The length of the newly designated $RL_c$ 404 is then added to the length of $RL_o$. As a result of steps 332–334, the length of $RL_o$ increases from one pixel to four pixels and source run lengths 400, 402, and 404 have been combined into a single output run length.

Processor 34 advances to step 335 from step 334 to use $RL_c$ 404 to protect from removal touching run lengths on $SL_s$ 439. The ability of $RL_c$ 404 to protect touching run lengths is not an issue because execution of step 334 made $RL_c$ a part of the current output run length $RL_o$, which is permanent by definition. Execution of step 335 has no effect while run length 404 is designated as $RL_c$. $RL_c$ 404 touches only run lengths 442 and 444 of scan line 439. $RL_c$ 404 cannot protect run length 442 because the colors of the two run lengths differ. Run length 444 does not require protection from removal because run length 444 is larger than the maximum speck size. Step 335 can be implemented using steps identical to steps 316–320, which will be discussed in detail below.

From step 335, processor 34 advances to step 336 to determine whether any source run lengths on $SL_s$ 439 remain to be examined. As such run lengths remain, processor 34 returns to step 302 from step 336.

Processor 34 designates source run length 406 as $RL_c$ during step 302. Processor determines during step 304 that $RL_c$ 406 is not a speck suspect because its length, 100 pixels, exceeds the maximum speck size. Protected from removal, $RL_c$ 406 may be able to protect other source run lengths on subsequent scan lines from removal. Processor 34 branches to step 315 to investigate that possibility. That investigation begins by comparing the length of $RL_c$ 406 to its cumulative size. If the two quantities are equal, then no source run length of $SL_s$ 439 can be protected by $RL_c$ 406. Cumulative size memory location 426 stores a value of 100, while run length 406 is 100 pixels in length. In response, processor 34 branches to step 326 from step 315.

Processor 34 reaches step 326 when the run length currently designated as $RL_c$ forces definition of a new output run length differing in color from that of the currently defined output run length. Stated another way, entry to step 326 means that the end of one speckless output run length has been located, as well as the beginning of another. In response, processor 34 outputs to bus 21 the current value of $RL_o$; i.e., 4. As this is the first output run length for output scan line $SL_o$ 398A, it represents a white run length. Subsequently, during step 328, processor 34 begins definition of the next output run length by setting the length of $RL_o$ equal to that of $RL_c$ 406, 100. This new $RL_o$ will represent a black run length when it is output. From step 328 processor 34 advances to step 336.

During step 336 processor 34 discovers additional source run lengths of $SL_c$ 398 remain to be examined. In response, processor 34 branches to step 302.

Source run length 408 is designated as $RL_c$ during step 302. $RL_c$ 408 requires no protection from removal because of its 100 pixel length. Accordingly, processor 34 branches to step 315 from step 304. Processor 34 determines that the length of $RL_c$ 408 does not equal its cumulative size of 255, stored in memory location 428. Processor 34 responds by branching to step 316 from step 315. From among the source run lengths within $SL_s$ touching $RL_c$ 408, processor 34 designates run length 444 as $RL_s$. $RL_s$ 444 is not a speck suspect because its length of 199 exceeds the maximum speck size. In response processor 34 advances to step 324 from step 317. Processor 34 discovers that not all source run lengths on $SL_s$ 439 touched by $RL_c$ 408 have been examined. Consequently, processor 34 returns to step 316 and designates run length 446 as $RL_s$. Subsequent execution of steps 317 and 318 reveals that $RL_s$ and $RL_c$ are not the same color, thus processor 34 returns again to step 324. This time all run lengths on $SL_s$ touched by $RL_c$ have been examined, so processor 34 branches to step 326 from step 324.

During step 326, processor 34 outputs to bus 21 the current value of $RL_o$, 100. This output run length represents a run of black pixels. Next, during step 328 processor 34 sets the value of $RL_o$ equal to that of $RL_c$ 408. In other words, $RL_o$ now equals 100 and represents a white run length. That done, processor 34 discovers during step 336 that its labors are not complete. Because not all source run lengths of $SL_c$ 398 have been examined, processor 34 returns to step 302.

Returning to step 302, processor 34 designates source run length 410 as $RL_c$. Processor 34 discovers during step 304 that $RL_c$ 410 may be able to protect other run lengths from removal because $RL_c$ 410 is permanent. Processor 34 responds to this discovery by branching to step 315. The size of $RL_c$ 410 does not equal its cumulative size of 9, stored in memory location 430, so processor 34 advances to step 316. Processor 34 designates as $RL_s$ one of the source run lengths on $SL_s$ 439 touching $RL_c$ during step 316. Only one of the three source run lengths on $SL_s$ 439 touching $RL_c$ requires protection from removal, run length 446. Run length 446 helped make run lengths 410 and 450 permanent, yet is not permanent itself. Memory location 466, associated with run length 446, stores a cumulative value of 6 at $\tau_{10}$. Consider then the situation when run length 446 is designated as $RL_s$. Processor 34 discovers during step 318 that $RL_c$ 410 and $RL_s$ 446 are the same color. Processor 34 responds by branching to 320 and making $RL_s$ 446 permanent by storing a value of 255 in memory location 466 at $\tau_{11}$.

Efforts to protect other run lengths on $SL_s$ 439 from removal via intercession of $RL_c$ 410 are neither fruitful, nor interesting, so they will not be discussed. Eventually, while run length 410 is designated $RL_c$, processor 34 will branch to step 326 from step 324. During step 326, processor 34 outputs the current value of $RL_o$, 100. Afterward, the value of $RL_o$ is set equal to that of $RL_c$ 410, three. Processor 34 continues executing process 300 in the manner described until encountering the EOL character.

Output scan line $SL_o$ 398A indicates graphically scan line 398 as represented by the output run lengths. Notice that the speck represented by source run length 402 has disappeared, merged into output run length 500.

Thus, a method of removing salt and pepper specks from an image represented by scan line signals has been described. The method transforms source run lengths into speckless output run lengths in a manner that changes the color of pixels representing specks, so that the specks are absorbed into adjacent run lengths of opposite color. As a consequence, when reproduced using the speckless run lengths the image is without specks.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than restrictive sense.

What is claimed is:

1. A method of preventing reproduction of specks while reproducing an image including specks using a computer, the image being represented by source scan line signals, each source scan line signal representing a source scan line including a first multiplicity of source run lengths, each source run length representing a number of pixels, each pixel corresponding to a position on a reproduction device within an imaginary grid, each source run length having an associated color, the associated color being a one of white and black, alternating source run lengths within a source scan line having different associated colors, the computer including a processor coupled to a memory storing instructions to be executed by the processor to reproduce the image, the method comprising the computer-implemented steps of:
  a) selecting a selected source run length from the first multiplicity of source run lengths of a first source scan line signal;
  b) determining whether the selected source run length represents part of a speck;
  c) if the selected source run length represents part of a speck:
    1) determining if the selected source run length is coupled to a second source run length on a second source scan line, the associated color of the second source run length being the same as the associated color of the selected source run length, the second source run length not representing part of a speck;
    2) preventing reproduction of the selected source run length if the selected source run length is not coupled to the second source run length; and
  d) if reproduction of the selected source run length is not prevented, outputting a speckless output run length, the output run length extending to a start of the selected source run length.

2. The method of claim 1 wherein step b) comprises:
  comparing the number of pixels associated with the selected source run length to a maximum speck size, the selected source run length representing a speck if the associated number of pixels is less than the maximum speck size.

3. The method of claim 1 wherein step c2) comprises:
  storing a first value less than the maximum speck size in the memory at a memory location associated with the selected source run length.

4. The method of claim 1 further comprising the step of:
  c3) insuring reproduction of the selected run length if the selected source run length is coupled to the second source run length.

5. The method of claim 4 wherein step c3) comprises:
  storing a second value greater than the maximum speck size in the memory at a memory location associated with the selected source run length.

6. A device for removing salt and pepper specks from an image including salt and pepper specks, the device including:
  a) a buffer having an input and an output, the input receiving a first multiplicity of source scan line signals representing a portion of the image, each source scan line signal representing a second multiplicity of source run lengths, each source run length representing a number of pixels, each source run length having an associated length and an associated color, the associated length indicating a number contiguous pixels of the associated color, the associated color being a one of white and black, alternating source run lengths within each source scan line having different associated colors, the buffer storing the first multiplicity of source scan line signals in a scan line store, the buffer also including a cumulative size store for indicating a cumulative size of source run lengths stored within the scan line store;
  b) a processor coupled to the buffer for removing the salt and pepper specks from the image by generating speckless output run length signals from the first multiplicity of source scan line signals, the processor performing the transformation using a set of instructions;

c) a memory coupled to the processor for storing the set of instructions, the set of instructions causing the processor to:
1) select a selected source run length from a selected source scan line from the first multiplicity of source scan line signals;
2) determine whether the source selected run length represents a speck;
3) if the selected source run length represents a speck:
   A) determine if the selected source run length is coupled to a second source run length on a second source scan line, the second scan line being a one of the first multiplicity of source scan lines, the associated color of the second source run length being the same as the associated color of the selected source run length, the second source run length not representing a speck;
   B) prevent reproduction of the selected source run length if the selected source run length is not coupled to the second run length; and
4) defining a speckless output run length associated with the selected source run length if reproduction of the selected source run length is not prevented, the speckless run length having an output color that is a one of white and black.

7. A method of removing specks from an image including salt and pepper specks using a computer, the image being represented by source scan line signals, each source scan line signal representing a scan line including a multiplicity of source run lengths, each source run length having an associated length and an associated color, the associated length representing contiguous pixels of the associated color, the associated color being a one of white and black, alternating source run lengths within each source scan line having different associated colors, the computer including a processor coupled to a memory device storing instructions to be executed by the processor, the processor controlling a buffer for storing source scan line signals, the method comprising the computer-implemented steps of:

a) selecting a selected source run length from a selected source scan line signal stored in the buffer;
b) determining whether the selected source run length might represent a speck;
c) if the selected source run length might represent a speck:
   1) determining if the selected source run length is coupled to a second source run length included in a second source scan line, the second scan line being represented by a second scan line signal stored in the buffer, the associated color of the second source run length being the same as the associated color of the selected source run length;
   2) insuring reproduction of the selected source run length if a cumulative size of the selected source run length is greater than a maximum speck size;
d) if the selected source run length does not represent a speck:
   1) determining if the selected source run length is coupled to the second source run length;
   2) insuring reproduction of the second source run length if the second source run length is coupled to the selected source run length;
e) if the selected source run length does not represent a speck and:
   1) outputting a speckless output run length associated with the selected source run length, the speckless output run length having an output color that is a one of white and black;
f) repeating steps a) through e) until every source run length included within the selected source scan line has been selected as the selected run length.

8. The method of claim 7 wherein the processor is coupled to a cumulative size store, the cumulative size store having a memory location associated with each source run length forming part of a one of the source scan line signals stored in the buffer, the memory location storing a value indicative of whether the associated source run length is to be removed.

9. The method of claim 8 wherein step c2) comprises:
storing a first value in the memory location associated with the selected source run length, the first value being greater than a maximum speck size.

10. The method of claim 9 wherein step d2) comprises:
storing a selected value in the memory location associated with the selected source run length, the selected value being greater than the maximum speck size.

11. The method of claim 7 wherein step b) further comprises the step of:
comparing the length associated with the selected source run length to the maximum speck size, the selected source run length not representing a speck if the length associated with the selected run length is greater than a maximum speck size.

12. The method of claim 8 wherein step b) further comprises the steps of:
A) comparing the length of the selected source run length to a maximum speck size, the selected source run length not representing a speck if the length associated with the selected source run length is greater than than the maximum speck size;
B) if the length of the selected source run length is less than the maximum speck size:
   1) comparing a value stored in a memory location associated with the selected source run length to the maximum speck size, the selected source run length representing a speck if the value is less than the maximum speck size.

13. The method of claim 8 wherein step c2) further comprises the steps of:
A) generating a cumulative size by summing values stored in the cumulative size store associated with the selected source run length and the second source run length; and
B) storing the cumulative size in the memory location associated with the selected source run length.

14. The method of claim 13 further comprising the step of:
C) storing the cumulative size in the memory location associated with the second source run length.

15. The method of 8 wherein step c2) comprises:
A) storing a selected value in the memory location associated with selected source run length, the selected value being greater than a maximum speck size.

* * * * *